(12) United States Patent
Trommelen et al.

(10) Patent No.: US 7,230,041 B2
(45) Date of Patent: Jun. 12, 2007

(54) BITUMINOUS COMPOSITIONS

(76) Inventors: Erik A. T. Trommelen, Badhuisweg 3, NL-1031, CM Amsterdam (NL); Duco Bodt, Badhuisweg 3, NL-1031, CM Amsterdam (NL); Jan Korenstra, Badhuisweg 3, NL-1031, CM Amsterdam (NL); Johan Plantinga, Badhuisweg 3, NL-1013, CM Amsterdam (NL)

( * ) Notice: Subject to any disclaimer, the term of this patent is extended or adjusted under 35 U.S.C. 154(b) by 0 days.

(21) Appl. No.: 10/537,686

(22) PCT Filed: Dec. 18, 2003

(86) PCT No.: PCT/EP03/51055

§ 371 (c)(1),
(2), (4) Date: Jun. 6, 2005

(87) PCT Pub. No.: WO2004/056924

PCT Pub. Date: Jul. 8, 2004

(65) Prior Publication Data

US 2006/0052489 A1 Mar. 9, 2006

(30) Foreign Application Priority Data

Dec. 20, 2002 (EP) .................... 02028543

(51) Int. Cl.
*C08L 95/00* (2006.01)
(52) U.S. Cl. ...................................... 524/68
(58) Field of Classification Search ................ 524/68
See application file for complete search history.

(56) References Cited

U.S. PATENT DOCUMENTS

| 3,231,635 A | 1/1966 | Holden et al. |
| 3,251,905 A | 5/1966 | Zelinski |
| 3,390,207 A | 6/1968 | Moss et al. |
| 3,598,887 A | 8/1971 | Darcy et al. |
| 4,219,627 A | 8/1980 | Halasa et al. |
| 4,987,194 A | 1/1991 | Maeda et al. |
| 5,075,377 A | 12/1991 | Kawabuchi et al. |
| 5,246,987 A | 9/1993 | Masse et al. |
| 5,399,627 A | 3/1995 | Diehl et al. |
| 5,405,903 A | 4/1995 | Van Westrenen et al. |
| 6,174,939 B1 | 1/2001 | Liang |
| 6,833,411 B2 | 12/2004 | Fujiwara et al. |
| 6,949,593 B2 * | 9/2005 | Heimerikx et al. ........... 524/68 |
| 2003/0191241 A1 | 10/2003 | Fujiwara et al. |
| 2003/0231928 A1 | 12/2003 | Hildebrand et al. |
| 2004/0116582 A1 | 6/2004 | De Keyzer et al. |

FOREIGN PATENT DOCUMENTS

| DE | 29 42 128 A1 | 4/1981 |
| EP | 0 387 671 A1 | 9/1990 |
| EP | 0 413 294 A2 | 2/1991 |
| EP | 0 636 654 A1 | 2/1995 |
| EP | 0 802 251 A1 | 10/1997 |
| EP | 1 426 411 A1 | 6/2004 |
| JP | 05070699 A | 3/1993 |
| JP | 05345885 A | 12/1993 |
| JP | 2000-239635 | 9/2000 |
| JP | 2004-131707 | 4/2004 |
| WO | 94/22931 | 10/1994 |

* cited by examiner

*Primary Examiner*—Peter Szekely
(74) *Attorney, Agent, or Firm*—Donna Blalock Holguin; Novak, Druce & Quigg

(57) ABSTRACT

The present invention relates to a bituminous composition, comprising a bituminous component and a block copolymer, wherein the block copolymer comprises at least two terminal poly(vinyl aromatic) blocks and at least one poly(conjugated diene) central block, wherein said poly(conjugated diene) central block(s) is (are) obtained by substantially random copolymerization of butadiene and isoprene a molar ratio between butadiene and isoprene in the range or from 1:2 to 9:1; wherein the poly(vinyl aromatic) content (PSC) is in the range of from 20 to 30 wt %, wherein the content of a possibly accompanying diblock comprising a poly(vinyl aromatic) block and a poly(butadiene/isoprene) block is at most 25 mole %, wherein the 1,2-addition (vinyl content) of the polymerized conjugated dienes is in the range of from 10 to 80%, and wherein the apparent molecular weight of the complete block copolymer is in the range of 310,000 to 380,000.

20 Claims, No Drawings

BITUMINOUS COMPOSITIONS

FIELD OF THE INVENTION

The present invention relates to bituminous compositions, comprising block copolymers derived from at least a vinyl aromatic monomer and at least one conjugated diene monomer.

BACKGROUND OF THE INVENTION

The block copolymers up to now applied in general in bituminous compositions for road applications, were composed of terminal poly(vinyl aromatic) blocks and poly(butadiene) and/or poly(isoprene) central blocks. Said block copolymers had a linear structure e.g. S—B—S or S—I—S, or a radial structure e.g. $(SB)_nX$ or $(SI)_nX$, wherein S represented a poly(vinyl aromatic) block, B represented a poly(butadiene) block and I represented a poly(isoprene) block, wherein X was the residue of a coupling agent and wherein n was an integer having a value of at least 3 and in particular in the range from 3 to 10.

Although said block copolymers, containing poly(butadiene) or poly(isoprene) central blocks have shown attractive high low temperature properties in bituminous blends which were maintained over time, providing an acceptable estimated service life, an experienced disadvantage of said block copolymers in bituminous compositions, was a significant viscosity increase after storage at high temperatures e.g. 180–200° C., which made the bituminous compositions difficult manageable after hot storage.

Moreover gel formation was encountered in bituminous compositions, composed in particular of S—B—S, after 70 hours or more storage at said higher temperatures. It will be appreciated that there is a clear need to eliminate or diminish such viscosity increase and gel formation, which deteriorate an efficient end-use processing of the bituminous blends. Therefore it is an object of the present invention to provide better processable bituminous compositions, comprising block copolymers, after storage at higher operation temperatures.

SUMMARY OF THE INVENTION

As result of extensive research and experimentation, said bituminous compositions and composing block copolymers aimed at, have surprisingly been found.

Accordingly, the invention relates to bituminous compositions, comprising a bituminous component and a block copolymer, wherein the block copolymer comprises at least two terminal poly(vinyl aromatic) blocks and at least one poly(conjugated diene) central block, wherein said poly(conjugated diene) central block(s) is (are) obtained by substantially random copolymerization of butadiene and isoprene in a molar ratio between butadiene and isoprene in the range of from 1:2 to 9:1 and preferably from 2:3 to 6:1 and more preferably from 1:1 to 3:1; wherein the poly(vinyl aromatic) content (PSC) is in the range of from 20 to 30 wt %, wherein the content of a possibly accompanying diblock, comprising a poly(vinyl aromatic) block and a poly(butadiene/isoprene) block is at most 25 mole % and more in particular from 0 to 15 mole % (diblock content), wherein de 1,2-addition (vinyl content) of the polymerized conjugated dienes is in the range of from 10 to 80% and preferably from 30 to 60%, and wherein the apparent molecular weight of the complete block copolymer is in the range of 310,000 to 380,000 and preferably from 315,000 to 375,000.

DETAILED DESCRIPTION OF THE INVENTION

Said bituminous compositions have been surprisingly found to show significant less viscosity increase during long term storage at 180° C. or higher, keeping the compositions better manageable after hot storage, and to show significant less gelation after even 144 hours. It will be appreciated that the bituminous compositions of the present invention can be more efficiently processed into end-use applications and more in particular road applications and roofing applications.

The block copolymer according to the present invention may be branched or linear and may be a triblock, tetrablock or multiblock. Preferably, it has a structure represented by the following general formulae

$$S\text{—}B\text{—}S \text{ (I), or } (S\text{—}B)\text{ n-}X \qquad (II)$$

wherein each S independently is a poly(vinyl aromatic) block and each B independently is a poly(conjugated diene) block, n is an integer equal to or greater than 2 and X is the residue of a coupling agent or multifunctional monomer.

It will be appreciated that the most preferred vinyl aromatic monomer is styrene, which is used as substantial pure monomer or as major component in mixtures with minor proportions of other structurally related vinyl aromatic monomer(s) such as o-methylstyrene, p-methylstyrene, p-tert-butylstyrene, 2,4-dimethylstyrene, α-metylstyrene, vinylnaphtalene, vinyltoluene and vinylxylene, i.e. in proportions of at most 10 wt %. The use of substantial pure styrene is most preferred. Preferably the apparent molecular weight of the poly(vinyl aromatic) blocks is in the range of from 12,000 to 28,000 and preferably from 15,000 to 25,000.

Similarly, the butadiene and isoprene monomers for the preparation of randomly copolymerized blocks, can be substantially pure monomer ingredients or can contain minor proportions of structurally related conjugated dienes, such as 2,3-dimethyl-1,3-butadiene, 1,3-pentadiene and 1,3-hexadiene, up to 10 wt %. The use of substantially pure butadiene and substantially pure isoprene is preferred.

With the term "apparent molecular weight", as used throughout the present specification, is meant the molecular weight, as measured by means of gel chromatography (GPC), relative to poly(styrene) calibration standards (according to ASTM 3536).

With the term "diblock content", as used throughout the present specification, is meant the proportion of free diblock which is finally present in the applied block copolymer.

It will be appreciated that when the block copolymer is prepared via a full sequential polymerization, no detectable amounts of free diblock copolymers will occur and the finally desired diblock amount can be adjusted if desired.

When the block copolymers have been prepared via the initial preparation of intermediate living diblock copolymers, which are subsequent coupled by means of a multivalent coupling agent, the initial diblock content will be determined by the coupling efficiency, which is normally in the range of from 85% to 97%.

The diblock content is preferably in the range of from 0 to 15 mole %.

With the term "substantially random copolymerized", as used throughout the present specification, is meant that the central (I/B) blocks only contain average homopolymer block lengths of less than 100 monomer units and preferably of less than 50 monomer units and more preferably of less than 20 monomer units. Said average homopolymer block length may be measured by means of carbon 13 NMR, as disclosed in detail in WO/057386A, pages 12–15.

The block copolymers, which are useful as modifiers in the bituminous compositions according to the present invention, may be prepared by any method known in the art including the well known full sequential polymerisation method, optionally in combination with reinitiation, and the coupling method, as illustrated in e.g. U.S. Pat. Nos. 3,231,635; 3,251,905; 3,390,207; 3,598,887 and 4,219,627 and EP0413294 A2; 0387671 B1; 0636654 A1; and WO 94/22931.

The block copolymer may therefore, for example, be prepared by coupling at least two diblock copolymer molecules together. The coupling agent may be any di- or polyfunctional coupling agent known in the art, for example, dibromoethane, silicon tetrachloride, diethyl adipate, divinylbenzene, dimethyldichlorosilane, methyl dichlorosilane. Particularly preferred in such a preparation route is the use of non-halogen containing coupling agents, for example gamma-glycidoxypropyl-trimethoxysilane, and diglycidylether of bisphenol A.

In general, the polymers useful in this invention may be prepared by contacting the monomer or monomers with an organoalkali metal compound in a suitable solvent at a temperature within the range from −150° C. to 300° C., preferably at a temperature within the range from 0° C. to 100° C. Particularly effective polymerization initiators are organolithium compounds having the general formula $$Rli$$

wherein R is an aliphatic, cycloaliphatic, alkyl-substituted cycloaliphatic, aromatic or alkyl-substituted aromatic hydrocarbon radical having from 1 to 20 carbon atoms of which sec.butyl is preferred.

Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof. Suitable solvents, then, include aliphatic hydrocarbons such as butane, pentane, hexane and heptane, cycloaliphatic hydrocarbons such as cyclopentane, cyclohexane and cycloheptane, alkyl-substituted cycloaliphatic hydrocarbons such as methylcyclohexane and methylcycloheptane, aromatic hydrocarbons such as benzene and the alkyl-substituted hydrocarbons such as toluene and xylene, and ethers such as tetrahydrofuran, diethylether and di-n-butyl ether. Preferred solvents are cyclopentane or cyclohexane.

The block copolymers according to the present invention can be made by mere adaptation of common processes used for the preparation of S—B—S type block copolymers and/or S—I—S type block copolymers, using a mixture of butadiene/isoprene instead. It is preferred in the preparation of the block copolymers according to the present invention to avoid homopolymer block formation, to ensure appropriate B/I ratio. This generally rules out the use of randomizers.

It may also be beneficial to adapt the process by adding one or both comonomers during the formation of the mixed midblock.

Techniques to enhance the vinyl content of the conjugated diene portion are well known and may involve the use of polar compounds such as ethers, amines and other Lewis bases and more in particular those selected from the group consisting of dialkylethers of glycols. Most preferred modifiers are selected from dialkyl ether of ethylene glycol containing the same or different terminal alkoxy groups and optionally bearing an alkyl substituent on the ethylene radical, such as monoglyme, diglyme, diethoxyethane, 1,2-diethoxypropane, 1-ethoxy-2,2-tert-butoxyethane, of which 1,2-diethoxypropane is most preferred.

The bituminous component present in the bituminous compositions according to the present invention may be a naturally occurring bitumen or derived from a mineral oil. Also petroleum pitches obtained by a cracking process and coal tar can be used as the bituminous component as well as blends of various bituminous materials. Examples of suitable components include distillation or "straight-run bitumens", precipitation bitumens, e.g. propane bitumens, blown bitumens, e.g. catalytically blown bitumen or "Multiphate", and mixtures thereof. Other suitable bituminous components include mixtures of one or more of these bitumens with extenders (fluxes) such as petroleum extracts, e.g. aromatic extracts, distillates or residues, or with oils. Suitable bituminous components (either "straight-run bitumens" or "fluxed bitumens") are those having a penetration of in the range of from 50 to 250 dmm at 25° C.; therefore quite hard bitumens of a penetration of from 60 to 70 dmm may be used, but generally a straight run or distilled bitumen having a penetration in the range of from 150 to 250 dmm will be the most convenient to use. Both compatible as well as incompatible bitumens may be used.

The polymer modifier is suitably present in the bituminous composition in an amount in the range of from 3 to 30% by weight, more typically from 6, or more preferably 10, to 15% by weight.

The bituminous composition may also, optionally, contain other ingredients such as may be required for the end-use envisaged. Thus fillers may be included, for example talc, calcium carbonate and carbon black, or other components including resins, oils, stabilisers or flame retardants may be incorporated. The content of such fillers and other components may be in the range of from 0 to as much as 40% by weight. Of course, if advantageous, other polymer modifiers may also be included in the bituminous composition of the invention.

The useful low temperature and high temperature properties of the polymer-bitumen blends of the present invention in combination with the improved ageing resistance and lower viscosity after storage at high temperatures, enables such blends to be of significant benefit in uses where the blends are exposed to external weather conditions, such as use in roofing applications, for example as a component of roofing felt. The usefully low high-temperature viscosity not just means that the polymer-bitumen blends can be more easily processed but also means that they enable a greater amount of filler to be incorporated before the maximum allowable processing viscosity is achieved, and thus leads to a cheaper product in those applications where fillers are commonly used.

More in particular, the bituminous blends according to the present invention show a better balance between tackiness and the Theological properties, required for self adhesive compositions for roofing applications. Attractive flow resistance and low temperature flexibility have been found, while the tack at about 20° C. of the formulated product has been found to be improved in comparison to S—B—S based compositions. Also the T-peel force has significantly increased in comparison to S—B—S based compositions.

Other applications in which the polymers themselves may be of use are in sound deadening, in adhesive, sealant or coating compositions and/or in vibration dampening compositions.

The following Examples illustrate the present invention, however without restricting its scope to these specific embodiments.

EXAMPLES 1–4

The bitumen grade that was used for the listed examples was compatible bitumen obtained by vacuum distillation of Venezuelan crude oil (in ESHA refinery, Amsterdam), having a penetration of 180 dmm at 25° C. (B-180).

The polymers used were clear radial linear block copolymers having a polystyrene content of about 30% (according to ASTM 3314), a final apparent molecular weight of about 380.000, a vinyl content of about 8% (as measured by IR spectroscopy in line with ASTM 3677) and a diblock content of less than 15%, having been produced with gamma-glycidoxypropyl-trimethoxysilane (gPTS) as coupling agent.

Polymer list

| Polymer | Description of poly(conjugated diene) block |
| --- | --- |
| P1 (*) | butadiene |
| P2 | isoprene/butadiene in 11/89 mol ratio |
| P3 | isoprene/butadiene in 17/83 mol ratio |
| P4 | isoprene/butadiene in 50/50 mol ratio |

(*) Comparative

A blend of 12% by weight of polymer in bitumen was prepared for each of the above polymers P1 to P4 by the following procedure in which a Silverson LR2 high shear mixer was used. The bitumen was heated to 160° C. and subsequently the polymer was added. During polymer addition the temperature increased to 180° C., which is caused by the energy input of the mixer. At 180° C. the temperature was kept constant by on/off switching of the high shear mixer. Blending was continued until a homogeneous blend was obtained which was monitored by fluorescence microscopy. Generally the blending time was around 60 minutes.

The polymer-bitumen blends were then tested for suitability for roofing applications. The evaluations for both cold temperature and high temperature performance are given in Table 1 below.

The test methods used were:

Softening point R&B: according to ASTM D36, corrected for stirring with +1.5° C., Gelation: evaluated at 200° C. using a Haeke roto-viscometer at low shear, 300 r.p.m. and 20 nL air on surface Cold bend (CB): evaluated under UEAtc M.O.A.T. no. 31:1984

Flow Resistance Temperature: evaluated under DIN 52123

TABLE 1

(Bitumen composition based on B180)

| Polymer (12%) | R&B ° C. | Flow-resist | Cold bend | Gelation hr. |
| --- | --- | --- | --- | --- |
| P1 (*) | 122 | 100 | −35 | 43 |
| P2 | 125 | 105 | −30 | 55 |
| P3 | 128 | 110 | −35 | 66 |
| P4 | 122 | 105 | −35 | 138 |

(*) Comparative

EXAMPLES 5–6

The procedure of Examples 1–4 were repeated, however using polymers P5 and P6 having a high molecular weight and having a high vinyl content. Thus, P5 (comparative) has a final apparent molecular weight of about 500.000 and a vinyl content of about 40%. Polymer P6 corresponds to P5, other than that it has a mixed midblock (isoprene:butadiene molar ratio of 50:50) and a vinyl content of about 60%.

This type of polymer, having an increased vinyl content, is used in applications were increased softening point is desirable. On the other hand, increased vinyl content strongly affects the susceptibility of the polymer towards gelation. The results are in Table 2.

TABLE 2

(Bitumen composition based on B180)

| Polymer (12%) | R&B ° C. | Flow-resist | Cold bend | Gelation hr. |
| --- | --- | --- | --- | --- |
| P5 (*) | 134 | 115 | −20 | 8 |
| P6 | 131 | 100 | −15 | >72 |

(*) Comparative

CONCLUSION

From Table 1 it can clearly be seen that the polymers according to the invention, P2–P4 have an increased resistance to gelation without adversely affecting R&B, Flow-resistance, and cold bend properties. This effect is more pronounced when comparing P6 (with a very high vinyl content) with P5.

The invention claimed is:

1. A bituminous composition, comprising a bituminous component and a block copolymer,
   wherein the block copolymer comprises at least two terminal poly(vinyl aromatic) blocks and at least one poly(conjugated diene) central block, wherein said poly(conjugated diene) central block(s) is (are) obtained by substantially random copolymerization of butadiene and isoprene in a molar ratio between butadiene and isoprene in the range of from 1:2 to 9:1;
   wherein the poly(vinyl aromatic) content (PSC) is in the range of from 20 to 30 wt %,
   wherein the content of a possibly accompanying diblock, comprising a poly(vinyl aromatic) block and a poly(butadiene/isoprene) block is at most 25 mole %,
   wherein the 1,2-addition (vinyl content) of the polymerized conjugated dienes is in the range of from 10 to 80%, and
   wherein the apparent molecular weight of the complete block copolymer is in the range of 310,000 to 380,000.

2. The bituminous composition of claim 1, wherein the block copolymer comprises butadiene and isoprene in a molar ratio in the range of from 2:3 to 6:1.

3. The bituminous composition of claim 1, wherein the diblock content of the block copolymer is in the range of from 0 to 15 mole %.

4. The bituminous composition of claim 1, wherein the vinyl content of the block copolymer is in the range of from 30 to 60%.

5. The bituminous composition of claim 1, wherein the apparent molecular weight of the entire block copolymer is in the range of from 315,000 to 375,000.

6. The bituminous composition of claim 1, wherein the block copolymer is present in the bituminous composition in an amount in the range of from 3 to 30% by weight.

7. The bituminous composition of claim 1, wherein the block copolymer is present in the bituminous composition in an amount in the range of from 6 to 15% by weight.

8. The bituminous composition of claim 1, further comprising fillers, resins, oils, stabilisers or flame retardants in an amount in the range of from 0 to 40% by weight.

9. The bituminous composition of claim 1, wherein the block copolymer comprises butadiene and isoprene in a molar ratio in the range of from 1:1 to 3:1.

10. The bituminous composition of claim claim 2, wherein the diblock content of the block copolymer is in the range of from 0 to 15 mole %.

11. The bituminous composition of claim 10, wherein the vinyl content of the block copolymer is in the range of from 30 to 60%.

12. The bituminous composition of claim 11, wherein the apparent molecular weight of the entire block copolymer is in the range of from 315,000 to 375,000.

13. The bituminous composition of claim 12, wherein the block copolymer is present in the bituminous composition in an amount in the range of from 3 to 30% by weight.

14. The bituminous composition of claim 13, wherein the block copolymer is present in the bituminous composition in an amount in the range of from 6 to 15% by weight.

15. The bituminous composition of claim 14, further comprising fillers, resins, oils, stabilisers or flame retardants in an amount in the range of from 0 to 40% by weight.

16. A bituminous composition, comprising a bituminous component and 3 to 30% by weight of a block copolymer,
wherein the block copolymer comprises at least two terminal poly(vinyl aromatic) blocks and at least one poly(conjugated diene) central block, wherein said poly(conjugated diene) central block(s) is (are) obtained by substantially random copolymerization of butadiene and isoprene in a molar ratio between butadiene and isoprene in the range of from 1:2 to 9:1;
wherein the poly(vinyl aromatic) content (PSC) is in the range of from 20 to 30 wt %,
wherein the content of diblock, comprising a poly(vinyl aromatic) block and a poly(butadiene/isoprene) block is at most 15 mole %,
wherein the 1,2-addition (vinyl content) of the polymerized conjugated dienes is in the range of from 30 to 60%, and
wherein the apparent molecular weight of the complete block copolymer is in the range of 310,000 to 380,000.

17. The bituminous composition of claim 1, wherein the vinyl content of the block copolymer is in the range of from 10 to 60%.

18. The bituminous composition of claim 6, wherein the vinyl content of the block copolymer is in the range of from 10 to 60%.

19. The bituminous composition of claim 13, wherein the vinyl content of the block copolymer is in the range of from 10 to 60%.

20. A bituminous composition, comprising a bituminous component and a block copolymer,
wherein the block copolymer comprises at least two terminal poly(vinyl aromatic) blocks and at least one poly(conjugated diene) central block, wherein said poly(conjugated diene) central block(s) is (are) obtained by substantially random copolymerization of butadiene and isoprene in a molar ratio between butadiene and isoprene in the range of from 1:2 to 9:1;
wherein the poly(vinyl aromatic) content (PSC) is in the range of from 20 to 30 wt %,
wherein the content of a possibly accompanying diblock, comprising a poly(vinyl aromatic) block and a poly (butadiene/isoprene) block is at most 25 mole %,
wherein the 1,2-addition (vinyl content) of the polymerized conjugated dienes is in the range of about 40% and
wherein the apparent molecular weight of the complete block copolymer is 500,000.

* * * * *